(12) United States Patent
Korn et al.

(10) Patent No.: US 10,417,439 B2
(45) Date of Patent: Sep. 17, 2019

(54) POST-HOC MANAGEMENT OF DATASETS (71) Applicant: Google LLC, Mountain View, CA (US)

(72) Inventors: Philip Korn, New York, NY (US); Steven Euijong Whang, Mountain View, CA (US); Natalya Fridman Noy, San Carlos, CA (US); Sudip Roy, San Jose, CA (US); Neoklis Polyzotis, San Jose, CA (US); Alon Yitzchak Halevy, Los Altos, CA (US); Christopher Olston, Los Altos, CA (US)

(73) Assignee: Google LLC, Mountain View, CA (US)

( * ) Notice: Subject to any disclaimer, the term of this patent is extended or adjusted under 35 U.S.C. 154(b) by 165 days.

(21) Appl. No.: 15/480,971

(22) Filed: Apr. 6, 2017

(65) Prior Publication Data

US 2017/0293671 A1    Oct. 12, 2017

Related U.S. Application Data

(60) Provisional application No. 62/319,914, filed on Apr. 8, 2016.

(51) Int. Cl.
*G06F 17/30* (2006.01)
*G06F 21/62* (2013.01)
*G06F 16/21* (2019.01)
*G06F 16/215* (2019.01)

(52) U.S. Cl.
CPC ........ *G06F 21/6218* (2013.01); *G06F 16/211* (2019.01); *G06F 16/215* (2019.01)

(58) Field of Classification Search
CPC ... G06F 16/211; G06F 16/215; G06F 21/6218
See application file for complete search history.

(56) References Cited

U.S. PATENT DOCUMENTS

| | | | |
|---|---|---|---|
| 2007/0162436 A1* | 7/2007 | Sehgal | G06F 16/683 |
| 2012/0016901 A1 | 1/2012 | Agarwal et al. | |
| 2013/0268531 A1 | 10/2013 | Platt et al. | |
| 2014/0115012 A1* | 4/2014 | Das | G06F 16/211 |
| | | | 707/803 |
| 2014/0181505 A1* | 6/2014 | Moore | H04L 63/0823 |
| | | | 713/156 |
| 2014/0304274 A1 | 10/2014 | Tennant | |

(Continued)

*Primary Examiner* — Greta L Robinson
(74) *Attorney, Agent, or Firm* — Fish & Richardson P.C.

(57) ABSTRACT

Methods, systems, and apparatus, including computer programs encoded on computer storage media, for generating a catalog for multiple datasets, the method comprising accessing multiple extant data sets, the extant data sets including data sets that are independently generated and structurally dissimilar; organizing the data sets into collections, each data set in each collection belonging to the collection based on collection data associated with the data set; for each collection of data sets: determining, from a subset of the data sets that belong to the collection, metadata that describe the data sets that belong to the collection, wherein the metadata does not include the collection data, and attributing, to other data sets in the collection, the metadata determined from the subset of data sets; and generating, from the collections of data sets and the determined metadata, a catalog for the multiple datasets.

20 Claims, 3 Drawing Sheets

(56) References Cited

U.S. PATENT DOCUMENTS

| | | | |
|---|---|---|---|
| 2014/0343957 A1* | 11/2014 | Dejori | G16H 50/70 |
| | | | 705/2 |
| 2015/0134685 A1 | 5/2015 | Sekharan | |
| 2015/0178167 A1* | 6/2015 | Kulkarni | G06F 11/1446 |
| | | | 707/649 |
| 2015/0220539 A1 | 8/2015 | Lambert et al. | |
| 2015/0242407 A1 | 8/2015 | Frohock et al. | |

\* cited by examiner

POST-HOC MANAGEMENT OF DATASETS

CROSS-REFERENCE TO RELATED APPLICATION

This application claims priority to U.S. Provisional Application Ser. No. 62/319,914, filed on Apr. 8, 2016, the entire contents of which are hereby incorporated by reference.

BACKGROUND

This specification relates to managing data sets.

Enterprises increasingly rely on structured datasets to run their businesses. These datasets take a variety of forms, such as structured files, databases, spreadsheets, or even services that provide access to the data. The datasets often reside in different storage systems, may vary in their formats, may change every day.

Most large enterprises today witness an explosion in the number of datasets that they generate internally for use in ongoing research and development. The reason behind this explosion is simple: by allowing engineers and data scientists to consume and generate datasets in an unfettered manner, enterprises promote fast development cycles, experimentation, and ultimately innovation that drives their competitive edge. As a result, these internally generated datasets often become a prime asset of the company, on par with source code and internal infrastructure. However, while enterprises have developed a strong culture on how to manage the latter, with source-code development tools and methodologies that are now considered "standard" in the industry (e.g., code versioning and indexing, reviews, or testing), similar approaches do not generally exist for managing datasets.

SUMMARY

This specification describes methods and systems, including computer programs encoded on computer storage media, for organizing structured data sets at scale.

In general, one innovative aspect of the subject matter described in this specification can be embodied in methods that include the actions of accessing a plurality of extant data sets, the plurality of extant data sets including data sets that are generated independent of each other and structurally dissimilar; organizing the data sets into a plurality of collections, each collection including two or more data sets from the plurality of data sets, each data set in each collection belonging to the collection based on collection data associated with the data set, and each collection corresponding to collection data that is different from the collection data that corresponds to the other collections; for each collection of data sets: determining, from a subset of the data sets that belong to the collection, metadata that describe the data sets that belong to the collection, wherein the metadata does not include the collection data; attributing, to other data sets in the collection that are not included in the subset of data sets in the collection, the metadata determined from the subset of data sets; generating, from the collections of data sets and the metadata determined from the respective subsets of datasets, a catalog for the plurality of datasets, wherein the catalog includes an entry for each dataset in the plurality of datasets, and each entry describes the collection to which the dataset belongs and the metadata for the dataset.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the collection data is a path of a location of a dataset.

In some implementations the datasets that belong to a collection include different instances of a particular dataset stored at a location identified by the path.

In other implementations the datasets that belong to a collection include datasets that each have at least a sub-path name in its respective path that is common to each path of each dataset included in the collection.

In some cases the metadata include timestamp, file format, owners, and access permissions of the datasets.

In other cases the metadata includes provenance data that describes one or more of dataset production in a workflow, dataset consumption in a workflow, dataset parent dependencies, and dataset child dependencies.

In some implementations the metadata include a schema of the dataset.

In other implementations the metadata include a content summary that describes the content stored in a dataset.

In some cases the metadata include user-defined annotations.

In some implementations the method further comprises receiving one or more keyword search queries; matching the one or more keyword search queries to one or more datasets included in the plurality of datasets in the generated data catalog; ranking the matched one or more datasets using a scoring function, wherein the scoring function ranks each dataset based on one or more of (i) the type of dataset, (ii) the index section of the dataset, (iii) lineage fan-out of the dataset or (iv) a description of the dataset; and providing a predetermined number of highest ranking datasets for output in response to receiving the one or more keyword search queries.

Particular embodiments of the subject matter described in this specification can be implemented so as to realize one or more of the following advantages. A data cataloging system implementing post-hoc management of datasets addresses the problem of how to organize structured datasets at scale, in a setting where teams use diverse and often idiosyncratic ways to produce the datasets and where there is no centralized system for storing and querying them. The data cataloging system extracts metadata ranging from salient information about each dataset (e.g., owners, timestamps, schema) to relationships among datasets, such as similarity and provenance. It then exposes this metadata through services that allow engineers to find datasets within the company, to monitor datasets, to annotate them in order to enable others to use their datasets, and to analyze relationships between them. The attribution of metadata determined from a subset of data sets within a collection of data sets improves data set indexing technologies by reducing the computing resources and time required to index a large set of data sets.

A dataset cataloging system implementing post-hoc dataset management provides a principled and flexible approach to dataset management, reducing the risk of internal siloing of datasets, thus reducing losses in productivity and opportunities, duplication of work and mishandling of data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a post-hoc system for organizing datasets at scale. Specifically, the system collects and aggregates metadata about datasets after the datasets were created, accessed, or updated by various pipelines, without interfering with dataset owners or users. Users are thus able to continue to generate and access datasets using the tools of their choice, and the system works in the background, in a nonintrusive manner, to gather the metadata about datasets and their usage. The system then uses this metadata to power services that enable engineers to organize and find their datasets in a principled manner.

Figure 1:
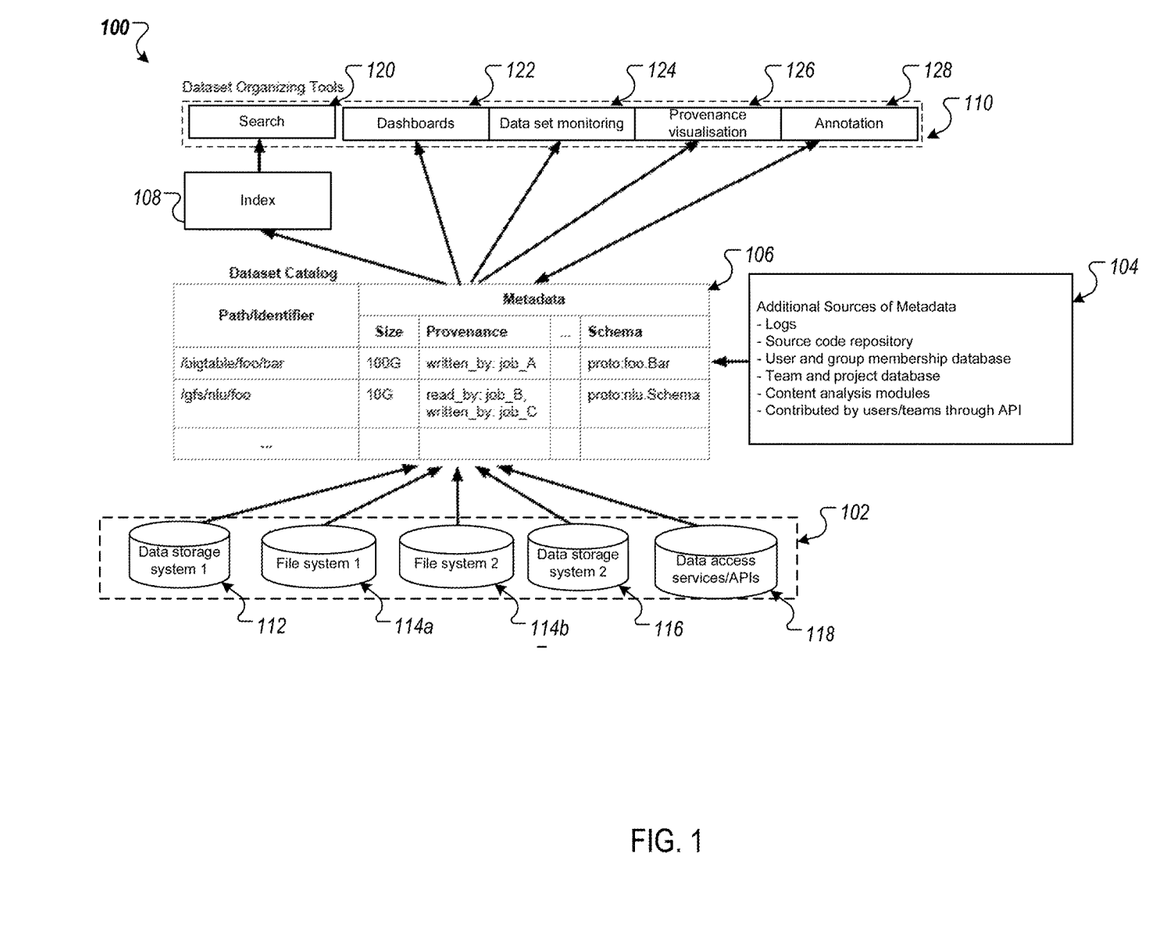
FIG. 1 is a schematic overview of an example data cataloging system.

FIG. 1 is a schematic overview of an example data cataloging system 100. The data cataloging system 100 is an example of a system implemented as computer programs on one or more computers in one or more locations, in which the systems, components, and techniques described below can be implemented.

The system 100 crawls different storage systems and production infrastructure, e.g., logs from running pipelines, to discover which datasets exist and to gather metadata about each dataset, e.g., owners, times of access, content features, accesses by production pipelines. The system aggregates the metadata in a central catalog and correlates the metadata about a specific dataset with information about other datasets.

The system 100 includes one or more storage systems 102, additional sources of metadata 104, dataset catalog 106, index 108 and dataset organizing tools 110. For example, the one or more storage systems may include a large database storage system 112, one or more file systems 114a and 114b, and a data access services/APIs storage system 118. Other storage systems may also be used.

The system 100 accesses the storage systems 102 to collect metadata about data sets stored in the storage systems 102. The system may also infer metadata about data sets by processing other sources of metadata 104 such as logs and information about dataset owners and their projects, by analyzing content of the datasets, and by collecting input from the system users.

The system stores the collected metadata in dataset catalog 106. The information stored in dataset catalog 106 is used to build dataset organizing tools 110. For example, the dataset organizing tools 110 may include a search tool 120, a dashboard 122, a dataset monitoring tool 124, a provenance visualization module 126 and an annotation tool 128. The dataset organizing tools 110 may be used to search, monitor and visualize the flow of data.

As will be described in more detail below, the resulting catalog uses a Path/Identifier to collect data sets, and then uses metadata that is different from the path/Identifier to describe the data sets. The path/identifier is an example of collection data that is data that is used to collect data sets into a collection, and that is also separate from the metadata that is used to describe the data sets. The generation of the catalog is described with reference to FIG. 2, which is a flow diagram of an example process 200 for generating a catalog for one or more data sets. For convenience, the process 200 will be described as being performed by a system of one or more computers located in one or more locations. For example, a data cataloging system, e.g., the data cataloging system 100 of FIG. 1, appropriately programmed in accordance with this specification, can perform the process 200.

Figure 2:
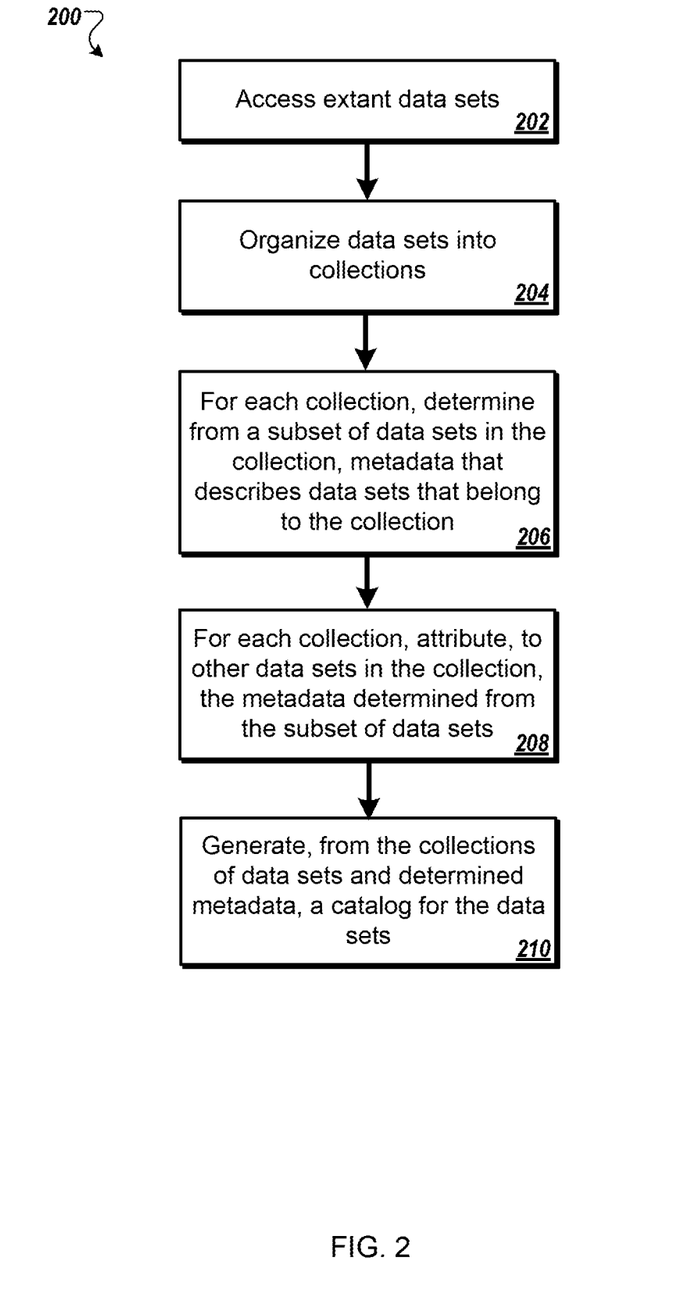
FIG. 2 is a flow diagram of an example process for generating a catalog for one or more data sets.

The system accesses a plurality of extant data sets (step 202). In some cases the plurality of extant data sets may include billions of data sets. The plurality of extant data sets includes data sets that are generated independent of each other and are structurally dissimilar. For example, the extant data sets may be stored in many formats, e.g., text files, csv files, and storage systems, e.g., particular file systems or database servers, where each data set may be associated with different types of metadata or access characteristics. In addition, the relationships between datasets may vary.

The data cataloging systems may exhibit a high level of churn of catalog entries, since every day production jobs generate new data sets, and old data sets are deleted—either explicitly or because their designated time-to-live has expired. By accessing extant data sets, the system is able to prioritize and specify which data sets are to be included in the data set catalog. For example, many of the datasets that have a limited Time-To-Live (TTL) from their creation are intermediate results of a large production pipeline that are garbage collected after a several data set accessing iterations (e.g., several days, if a collection iteration is done daily).

Another option is to ignore these transient datasets for metadata extraction, or even to exclude them from the catalog. However, there are two limitations on excluding data sets. First, for the datasets have long times to live (TTLs) (e.g., measured in weeks), their value to users can be high when the datasets are just created. Accordingly, these data sets will be included in the collection. Second, some of these transient datasets link non-transient datasets to each other and are thus required for some computations, such as data set provenance. Thus, such data sets are also included in the collection, even if they have a relatively short TTL.

The system organizes the extant data sets into a plurality of collections (step 204). Each collection in the plurality of collections includes two or more data sets from the plurality of data sets, with each data set in each collection belonging to the collection based on collection data associated with the data set. In some implementations the collection data is a path of a location of a dataset. Each collection in the plurality of collections corresponds to collection data that is different from the collection data that corresponds to the other collections. Other ways of organizing collections can also be used. For example, data sets that belong to a particular entity, such as a particular user, a particular company, or a particular division within a company may be grouped as a collection.

In some implementations the datasets that belong to a collection include different instances of a particular dataset stored at a location identified by the path. In other implementations the datasets that belong to a collection include datasets that each have at least a sub-path name in its respective path that is common to each path of each dataset included in the collection. Paths of the datasets give hints on how to cluster or organize the datasets, e.g., via embedded identifiers for timestamps, versions, and so on. As an example, consider a dataset that is produced daily and let "/dataset/2015-10-10/daily_scan" be the path for one of its instances. The day portion of the date may be abstracted out to get a generic representation of all datasets produced in a month: "/dataset/2015-10-<day>/daily_scan," representing all instances from October 2015. By abstracting out the month as well, the hierarchy may be ascended to create abstract paths that represent all datasets produced in the same year: "/dataset/2015-<month>-<day>/daily_scan."

For each collection of data sets, the system determines, from a subset of the data sets that belong to the collection, metadata that describe the data sets that belong to the collection (step 206). The metadata does not include the collection data. In some implementations the metadata is basic metadata and includes timestamps, file formats, owners, and access permissions of the datasets. For example, the system may obtain basic metadata by crawling storage systems.

In further implementations the metadata includes provenance data that describes one or more of dataset production in a workflow, dataset consumption in a workflow, dataset parent dependencies, and dataset child dependencies. Datasets are produced and consumed by code. This code may include analysis tools that are used to query datasets, serving infrastructures that provide access to datasets through APIs, or ETL pipelines that transform it into other datasets. Often, a dataset may be understood better through these surrounding pieces of software that produce and use it. Moreover, this information helps in tracking how data flows through the enterprise as well as across boundaries of teams and organizations within the company. Therefore, for each dataset, the system maintains the provenance of how the dataset is produced, how it is consumed, what datasets this dataset depends on, and what other datasets depend on this dataset.

In other implementations the metadata include a schema of the dataset. Schema may be a core type of metadata that helps understand a data set. In some implementations commonly used data set formats may not be self-describing, and the schema must be inferred. For example, records within structured datasets may be encoded as serialized protocol buffers. A difficulty lies in determining which protocol buffer was used to encode records in a given dataset. Protocol buffers may be checked into a central code repository such that the system has a full list of protocol buffers that may be made available to match against datasets that have been crawled. Matching may be performed by scanning a few records from the file, and going through each protocol message definition to determine whether it could conceivably have generated the bytes seen in those records. Protocol buffers encode multiple logical types as the same physical type, notably string and nested messages are both encoded as variable-length byte strings. Consequently, the matching procedure may be speculative and can produce multiple candidate protocol buffers. All the candidate protocol buffers, along with heuristic scores for each candidate, may become part of the metadata.

In some implementations the metadata include a content summary that describes the content stored in a dataset. For example, the system may record frequent tokens that are found by sampling the content. The system may analyze some of the data fields to determine if they contain keys for the data, individually or in combination. To find the potential keys, the system may use an algorithm, e.g., a HyperLogLog algorithm, to estimate the cardinality of values in individual fields and combinations of fields. The cardinality may be compared with the number of records to find potential keys. The system may also collect fingerprints that have checksums for the individual fields and locality-sensitive hash values for the content. The fingerprints may be used to find datasets with content that is similar or identical to the given data set, or columns from other datasets that are similar or identical to columns in the current dataset. The checksums may also be used to identify which data fields are populated in the records of the dataset.

In some implementations the metadata include user-defined annotations. For example, the system may enable data set owners to provide text descriptions of their data sets.

In addition to the metadata described above, the system may also collect identifiers for teams that own the data set, a description of the project to which a data set belongs, and the history of the changes to the metadata of the data set.

The cost of determining metadata that describes data sets may vary depending on the type and size of the data set and the type of metadata. The system may therefore determine metadata that describes the data sets using a differential process that identifies which datasets are important to cover and performs metadata inference based on the cost and benefit for having the particular type of metadata.

For each collection of data sets, the system attributes, to other data sets in the collection that are not included in the subset of data sets in the collection, the metadata determined from the subset of data sets (step 208). As described above with reference to step 202, in some cases the plurality of extant data sets may include billions of data sets. At this scale, gathering metadata for all datasets becomes infeasible—even spending one second per dataset (although it is noted that many datasets may be too large to process in one second), going through a catalog with 26 billion datasets using a thousand parallel machines may still require around 300 days. Instead of collecting expensive metadata for each individual dataset, the system may therefore collect metadata only for a few datasets in a collection, or a subset of the data datasets, and attribute the metadata to other data sets in the collection. The system then propagates the metadata across the other datasets in the collection. For instance, if the same job generates versions of a dataset daily, these datasets are likely to have the same schema. Thus, the system does not need to infer the schema for each version. Similarly, if a user provides a description for a dataset, it usually applies to all members of the collection and not just the one version. When the collections are large, the computational savings that the system obtains by avoiding analysis of each member of the cluster can be significant. An example of propagating owner's metadata to an unanalyzed dataset through a collection's representative element is illustrated below in FIG. 3.

The system generates, from the collections of data sets and the metadata determined from the respective subsets of datasets, a catalog for the plurality of datasets (step 210). The catalog includes an entry for each dataset in the plurality of datasets, and each entry describes the collection to which the dataset belongs and the metadata for the dataset. The catalog provides a uniform way for users to access and query information about all types of data sets, since the variety and complexity of the different data sets, as described above with respect to step 202, is hidden from the user. By construction, the catalog for the plurality of datasets may exclude types of uninteresting data sets, e.g., "marker" files that are content free, and may normalize paths to avoid obvious redundancies, e.g., normalize paths corresponding to different shards of the same data set to a common path and not storing the paths separately in the catalog.

The generated data catalog provides a variety of services enabled by the determined metadata. For example, the generated data catalog may allow for the exportation of metadata for a specific dataset in a profile page for the data set. For example, a profile page for a data set may accept as input the path of a data set or a data set collection and generate an HTML page from the metadata stored in the catalog. This service may provide methods to edit specific parts of the metadata, for example to allow users to either augment or correct the information stored in the catalog. Generally, a profile page may provide a single place where a user can inspect the information about a data set and understand a context in which the data set can be used in production, making the profile page a natural handle for sharing a data set among users or linking to data set information from other tools.

In some implementations the system may receive one or more keyword search queries and match the one or more keyword search queries to one or more datasets included in the plurality of datasets in the generated data catalog. The system may rank the matched one or more datasets using a scoring function, wherein the scoring function ranks each dataset based on one or more of (i) the type of dataset, (ii) the index section of the dataset, (iii) lineage fan-out of the dataset or (iv) a description of the dataset, and provide a predetermined number of highest ranking datasets for output in response to receiving the one or more keyword search queries.

For example, the generate data catalog may allow users to query the catalog and find data sets of interest. For example, the generated data catalog may allow for users to find data sets using simple keyword queries. The service may be backed by a conventional inverted index for document retrieval, where each dataset becomes a "document" and the indexing tokens for each document are derived from a subset of the dataset's metadata. For example, each token can be associated with a specific section of the index, e.g., a token derived from the path of the dataset may be associated with the "path" section of the index. Accordingly, the search atom "path:x" may match keyword "x" on dataset paths only, whereas the unqualified atom "x" will match the keyword in any part of a dataset's metadata. The extraction of indexing tokens follows from the type of queries that the index must cover. As an example, it may be desirable to support partial matches on the dataset path, where a user may search for "x/y" to match a dataset with path "a/x/y/b" (but not one with "a/y/x/b"). The system may break up the dataset's path along common separators and then associate each resulting token with its position in the path. For example, the path "a/x/y/b" may get mapped to the indexing tokens "a", "x", "y", and "b", in that sequence. When the user issues a search query with a partial path, the service parses the partial path the same way and matches the query's tokens against consecutive tokens in the index. Matching search keywords to datasets may only be one part of the search task. An additional part may include deriving a scoring function to rank the matching datasets, so that the top results are relevant for the user's search. The scoring function may score data sets and be tuned based on a user's experience. For example, the scoring function may score data sets based on how important the dataset is. In some examples the importance of a dataset may depend on the type of dataset.

As another example, the importance of a keyword match may depend on the index section of the dataset. For instance, a keyword match on a path of the dataset may be more important that a match on jobs that read or write the dataset. As a further example, lineage fan-out may be an indicator of dataset importance. For instance, if many production pipelines access the dataset, then it is likely the dataset is importance. As a further example, a dataset that carries an owner sourced description may be important. If a keyword match occurs in a description for a dataset, e.g., provided by the dataset owner, the dataset may be weighted higher.

Figure 3:
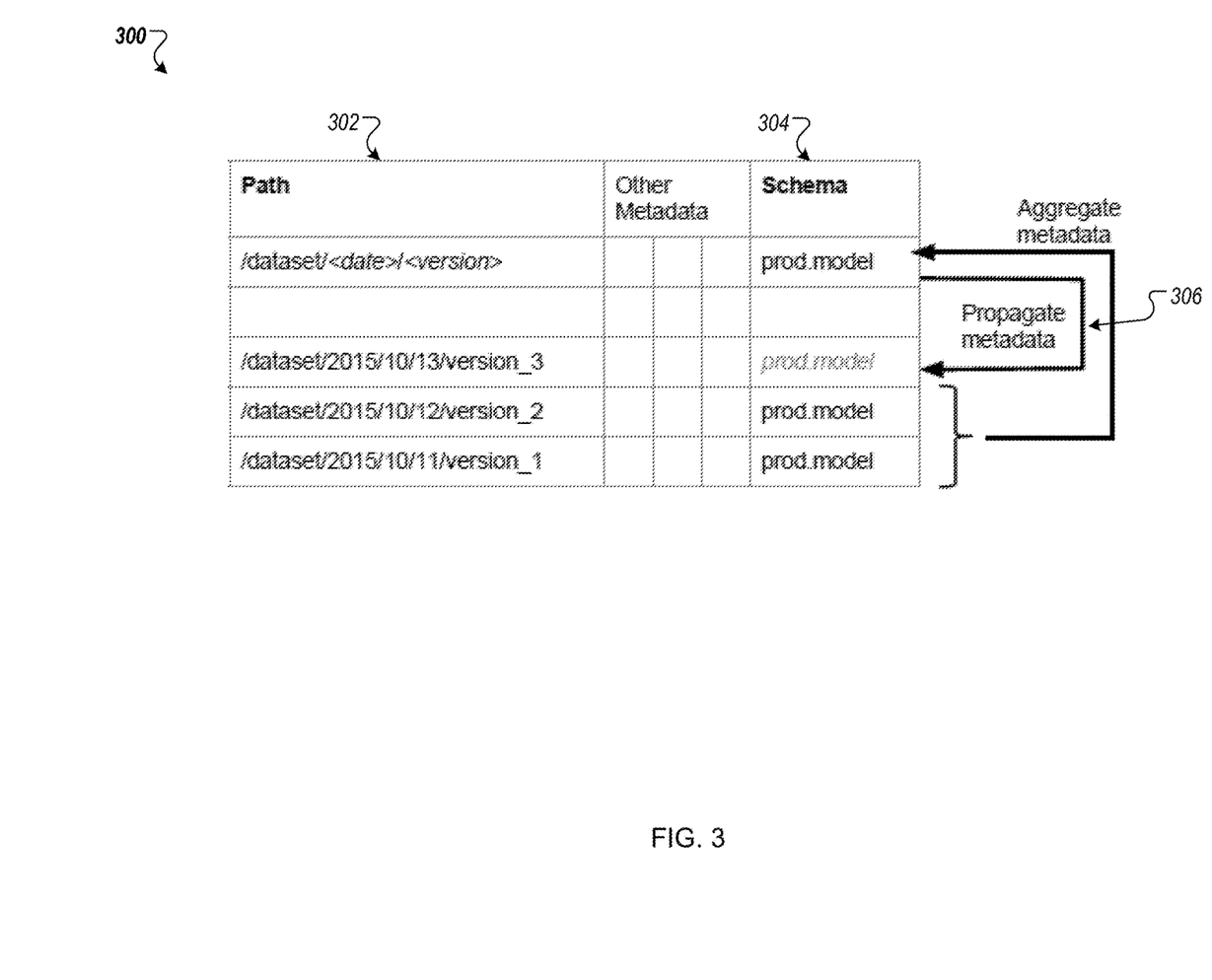
FIG. 3 illustrates an example of attributing metadata to an unanalyzed dataset through a collection's representative element.

FIG. 3 illustrates an example 300 of attributing metadata to an unanalyzed dataset through a collection's representative element. As illustrated in FIG. 3, owner's metadata is propagated to an unanalyzed data set through a collection's representative element. The schema 304 "prod.model" is known for several members of the collection 302, and is propagated 306 for the collection 302 as a whole.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g. an HTML page, to a user device, e.g. for purposes of displaying data to and receiving user input from a user interacting with the user device, which acts as a client. Data generated at the user device, e.g. as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method implemented in data processing apparatus of a plurality of computers, the method comprising:
accessing a plurality of extant data sets, the plurality of extant data sets including data sets that are generated independent of each other and structurally dissimilar;
organizing the data sets into a plurality of collections, each collection including two or more data sets from the plurality of data sets, each data set in each collection belonging to the collection based on collection data associated with the data set, and each collection corresponding to collection data that is different from the collection data that corresponds to the other collections;
for each collection of data sets:
determining, from a subset of the data sets that belong to the collection, metadata that describe the data sets that belong to the collection, wherein the metadata does not include the collection data;
attributing, to other data sets in the collection that are not included in the subset of data sets in the collection, the metadata determined from the subset of data sets such that the metadata determined to describe the subset of the data sets that belong to the collection are also determined to describe the other data sets in the collection that are not included in the subset of data sets in the collection;
generating, from the collections of data sets and the metadata determined from the respective subsets of datasets, a catalog for the plurality of datasets, wherein the catalog includes an entry for each dataset in the plurality of datasets, and each entry describes the collection to which the dataset belongs and the metadata for the dataset.

2. The method of claim 1, wherein the collection data is a path of a location of a dataset.

3. The method of claim 2, wherein the datasets that belong to a collection include different instances of a particular dataset stored at a location identified by the path.

4. The method of claim 2, wherein the datasets that belong to a collection include datasets that each have at least a sub-path name in its respective path that is common to each path of each dataset included in the collection.

5. The method of claim 2, wherein the metadata include timestamp, file format, owners, and access permissions of the datasets.

6. The method of claim 2, wherein the metadata includes provenance data that describes one or more of dataset production in a workflow, dataset consumption in a workflow, dataset parent dependencies, and dataset child dependencies.

7. The method of claim 2, wherein the metadata include a schema of the dataset.

8. The method of claim 2, wherein the metadata include a content summary that describes the content stored in a dataset.

9. The method of claim 2, wherein the metadata include user-defined annotations.

10. The method of claim 1, further comprising:
receiving one or more keyword search queries;
matching the one or more keyword search queries to one or more datasets included in the plurality of datasets in the generated data catalog;
ranking the matched one or more datasets using a scoring function, wherein the scoring function ranks each dataset based on one or more of (i) the type of dataset, (ii) the index section of the dataset, (iii) lineage fan-out of the dataset or (iv) a description of the dataset; and
providing a predetermined number of highest ranking datasets for output in response to receiving the one or more keyword search queries.

11. A system comprising one or more computers and one or more storage devices storing instructions that are operable, when executed by the one or more computers, to cause the one or more computers to perform a method comprising:
accessing a plurality of extant data sets, the plurality of extant data sets including data sets that are generated independent of each other and structurally dissimilar;
organizing the data sets into a plurality of collections, each collection including two or more data sets from the plurality of data sets, each data set in each collection belonging to the collection based on collection data associated with the data set, and each collection corresponding to collection data that is different from the collection data that corresponds to the other collections;
for each collection of data sets:
determining, from a subset of the data sets that belong to the collection, metadata that describe the data sets that belong to the collection, wherein the metadata does not include the collection data;
attributing, to other data sets in the collection that are not included in the subset of data sets in the collection, the metadata determined from the subset of data sets such that the metadata determined to describe the subset of the data sets that belong to the collection are also determined to describe the other data sets in the collection that are not included in the subset of data sets in the collection;
generating, from the collections of data sets and the metadata determined from the respective subsets of datasets, a catalog for the plurality of datasets, wherein the catalog includes an entry for each dataset in the plurality of datasets, and each entry describes the collection to which the dataset belongs and the metadata for the dataset.

12. The system of claim 11, wherein the collection data is a path of a location of a dataset.

13. The system of claim 12, wherein the datasets that belong to a collection include different instances of a particular dataset stored at a location identified by the path.

14. The system of claim 12, wherein the datasets that belong to a collection include datasets that each have at least a sub-path name in its respective path that is common to each path of each dataset included in the collection.

15. The system of claim 12, wherein the metadata include timestamp, file format, owners, and access permissions of the datasets.

16. The system of claim 12, wherein the metadata includes provenance data that describes one or more of dataset production in a workflow, dataset consumption in a workflow, dataset parent dependencies, and dataset child dependencies.

17. The system of claim 12, wherein the metadata include a schema of the dataset.

18. The system of claim 12, wherein the metadata include a content summary that describes the content stored in a dataset.

19. The system of claim 12, wherein the metadata include user-defined annotations.

20. A computer-readable storage medium comprising instructions stored thereon that are executable by a processing device and upon such execution cause the processing device to perform a method comprising:

accessing a plurality of extant data sets, the plurality of extant data sets including data sets that are generated independent of each other and structurally dissimilar;

organizing the data sets into a plurality of collections, each collection including two or more data sets from the plurality of data sets, each data set in each collection belonging to the collection based on collection data associated with the data set, and each collection corresponding to collection data that is different from the collection data that corresponds to the other collections;

for each collection of data sets:

determining, from a subset of the data sets that belong to the collection, metadata that describe the data sets that belong to the collection, wherein the metadata does not include the collection data;

attributing, to other data sets in the collection that are not included in the subset of data sets in the collection, the metadata determined from the subset of data sets such that the metadata determined to describe the subset of the data sets that belong to the collection are also determined to describe the other data sets in the collection that are not included in the subset of data sets in the collection;

generating, from the collections of data sets and the metadata determined from the respective subsets of datasets, a catalog for the plurality of datasets, wherein the catalog includes an entry for each dataset in the plurality of datasets, and each entry describes the collection to which the dataset belongs and the metadata for the dataset.

* * * * *